C. D. HIXSON.
DRINKING FOUNTAIN FOR POULTRY.
APPLICATION FILED MAR. 1, 1917.
1,224,544.
Patented May 1, 1917.
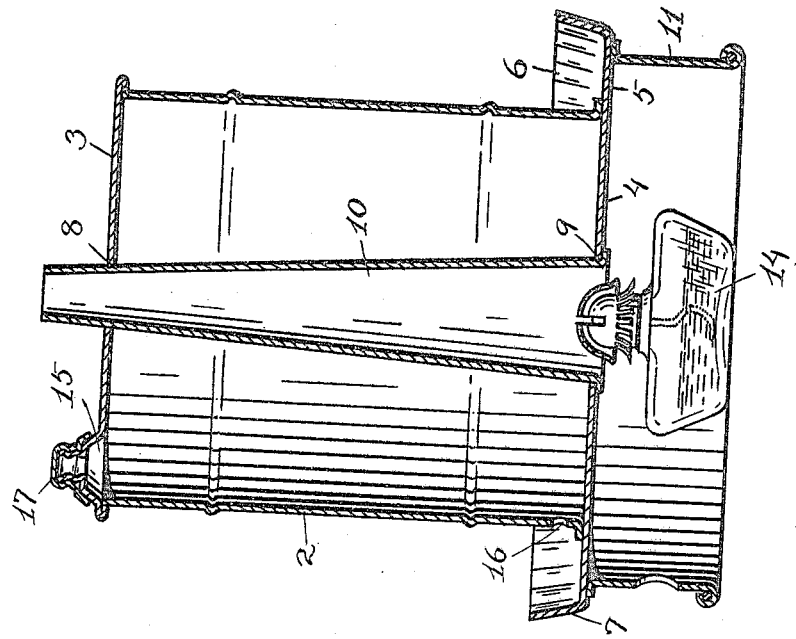
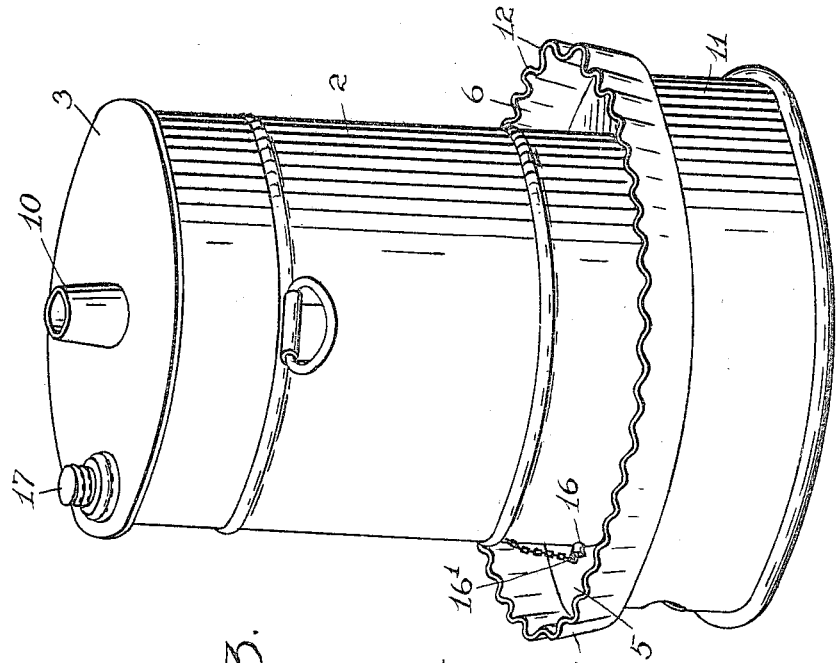

UNITED STATES PATENT OFFICE.

CALVIN D. HIXSON, OF HIAWATHA, KANSAS.

DRINKING-FOUNTAIN FOR POULTRY.

1,224,544.

Specification of Letters Patent. Patented May 1, 1917.

Application filed March 1, 1917. Serial No. 151,807.

*To all whom it may concern:*

Be it known that I, CALVIN D. HIXSON, citizen of the United States, resident of Hiawatha, in the county of Brown and State of Kansas, have made a certain new and useful Invention in Drinking-Fountains for Poultry; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied.

Fig. 2 is a central longitudinal section of the same.

Fig. 3 is a fragmentary perspective view, showing a fowl drinking from a portion of the trough.

The invention has relation to drinking fountains, designed particularly for poultry, and it consists in the novel construction and combination of parts, as hereinafter set forth.

In the accompanying drawings, illustrating the invention, the numeral 2 designates a cylindrical body or casing of sheet metal, having a horizontal top 3 and a horizontal bottom 4, said bottom extended beyond the side walls of the casing at 5 to form the bottom of an annular trough 6, the latter having an outer upstanding wall 7, the peripheral or side wall of the casing forming the inner wall of the trough.

The top of the casing is provided with a central opening 8, and the bottom thereof with a central opening 9, of diameter larger than the top opening, an upwardly tapering or frusto-conical flue 10 fitting at its upper end within said top opening and at its lower end within said bottom opening and being suitably secured in position therein.

Below the bottom of the casing is provided an annular cylindrical wall 11, forming a lower extension of the peripheral or side wall of the casing and being of a diameter larger than that of said casing and located intermediately of the bottom of the trough. The device is supported from the bottom edge of said extension, which rests upon a suitable support, usually upon the ground.

The outer side wall of the drinking trough is of serpentine or fluted character, the convolutions 12 thereof being of considerable comparative size, so that the fowl, seeking water from the nearest point in the trough, which would be the outer termination of a convolution, would have its wattles located at the sides of and without said convolution, the object being to prevent wetting of the wattles, and the freezing thereof in cold weather.

The lamp 14 for heating the water contained in the casing is placed upon the same support as that upon which the device or fountain is located, the body of the lamp being located in the chamber of the lower extension 11 of the casing, and the flue 10 acting as a chimney for said lamp.

The top of the casing is provided with a filling opening 15, an exit opening 16, located in the side wall of the casing, communicating with the trough. In filling, the opening 16 is stopped temporarily, with a stopper 16', attached to the end of a chain, the cap 17 of the filling opening being replaced in position before the stopper is removed from said opening.

I claim:

In a drinking fountain, a casing having a trough surrounding the same and supplied therefrom, said trough having its outer side wall provided with convolutions extending upwardly and downwardly and designed to prevent a fowl from wetting its wattles in drinking.

In testimony whereof I affix my signature, in presence of two witnesses.

CALVIN D. HIXSON.

Witnesses:
 GEO. O. M. LAUGHLIN,
 S. D. MOSER.

Copies of this patent may be obtained for five cents each, by addressing the "Commissioner of Patents, Washington, D. C."